(12) United States Patent
Hirata et al.

(10) Patent No.: US 7,113,669 B2
(45) Date of Patent: Sep. 26, 2006

(54) NEAR FIELD OPTICAL HEAD AND INFORMATION RECORDING AND REPRODUCING APPARATUS MOUNTED WITH THE NEAR FIELD OPTICAL HEAD

(75) Inventors: Masakazu Hirata, Chiba (JP); Manabu Oumi, Chiba (JP); Koichi Shibata, Chiba (JP)

(73) Assignee: Seiko Instruments Inc., (JP)

( * ) Notice: Subject to any disclaimer, the term of this patent is extended or adjusted under 35 U.S.C. 154(b) by 0 days.

(21) Appl. No.: 11/155,956

(22) Filed: Jun. 17, 2005

(65) Prior Publication Data

US 2006/0013013 A1    Jan. 19, 2006

(30) Foreign Application Priority Data

Jul. 15, 2004  (JP) .............................. 2004-208088
Dec. 17, 2004  (JP) .............................. 2004-366480
May 23, 2005  (JP) .............................. 2005-149321

(51) Int. Cl.
*G02B 6/26*  (2006.01)

(52) U.S. Cl. ........................... 385/28; 385/27; 385/50; 385/39; 359/368

(58) Field of Classification Search ................ 385/28; 359/368
See application file for complete search history.

(56) References Cited

U.S. PATENT DOCUMENTS 5,485,536 A * 1/1996 Islam ........................... 385/31
5,677,978 A * 10/1997 Lewis et al. ................. 385/147
5,812,724 A *  9/1998 Ohtsu et al. ................. 385/128
5,928,525 A *  7/1999 Ohtsu et al. .................. 216/24
6,236,783 B1 *  5/2001 Mononobe et al. ........... 385/43
6,340,813 B1 *  1/2002 Tominaga et al. .......... 250/216
6,370,306 B1 *  4/2002 Sato et al. .................. 385/129
6,393,185 B1 *  5/2002 Deacon ....................... 385/50
6,469,288 B1 * 10/2002 Sasaki et al. ............. 250/201.3
6,728,439 B1 *  4/2004 Weisberg et al. ............. 385/28
6,788,864 B1 *  9/2004 Ahmad et al. .............. 385/123
6,895,154 B1 *  5/2005 Johnson et al. ............. 385/125
6,898,359 B1 *  5/2005 Soljacic et al. ............. 385/123

* cited by examiner

*Primary Examiner*—Brian Healy
*Assistant Examiner*—Mary El-Shammaa
(74) *Attorney, Agent, or Firm*—Adams & Wilks (57) ABSTRACT

In order to provide a near field light head capable of guiding light efficiently to a near field light generating element, capable of being fabricated easily and at low cost and in correspondence with small-sized formation and thin-sized formation, the near field light head of the present invention has a transparent board including a near field light generating element at a lower face thereof. An upper face or the interior of the transparent board is formed with a lens to be opposed to the near field light generating element. The upper face of the transparent board is mounted with a single mode fiber. The single mode fiber is successively connected with a graded index (GI) fiber and a coreless fiber. An end face of the coreless fiber which is not connected to the GI fiber constitutes a reflecting face disposed at 45 degrees relative to the upper face of the transparent board. The reflecting face is arranged right above the lens.

14 Claims, 5 Drawing Sheets

NEAR FIELD OPTICAL HEAD AND INFORMATION RECORDING AND REPRODUCING APPARATUS MOUNTED WITH THE NEAR FIELD OPTICAL HEAD

FIELD OF THE INVENTION

The present invention relates to a near field optical head and an information recording and reproducing apparatus mounted with the near field optical head.

DESCRIPTION OF THE RELATED ART

There has been requested a recording and reproducing technology achieving a higher recording density for an information recording and reproducing apparatus promoting large capacity formation and small-sized formation. An information recording and reproducing technology utilizing near field light can deal with optical information of a small region exceeding a diffraction limit of light and therefore, it is expected to achieve a high recording density which cannot be reached by a recording and reproducing technology by light of a background art.

Although generally, a constitution of a recording and reproducing apparatus utilizing near field light is substantially similar to that of a magnetic disk device (HDD), the technology differs therefrom in that in place of a magnetic element of a GMR element or a coil, a near field light generating element constituted by an optically small opening or small projection or the like is mounted on a float up head slider, further, in place of an electric wiring, an optical fiber or a light waveguide is integrated thereto. (refer to, for example, Patent Reference 1) It is an important element of the near field light recording and reproducing technology how efficiently light is guided to a near field light generating element and record medium and how a compact constitution is constructed by using an optical fiber or a light waveguide having a degree of freedom of wiring lower than that of an electric wiring.

There is devised a method of making a small beam spot incident on an optically small opening by connecting an optical fiber or a light guide to a side face of a head and using a light reflecting face for reflecting light from the optical fiber or the optical guide propagated in a direction horizontal to a media face and directing a propagating direction to an opening direction (refer to Patent Reference 1).

[Patent Reference 1] International Patent Publication No. 00/28536 pamphlet

Although according to a constitution of the near field light head by the method of the background art shown in Patent Reference 1, the light reflecting face is provided by skewedly working an end portion of the light waveguide, a difficulty of working is high and it is difficult to achieve a smoothness of the light reflecting face. Further, also a number of steps is large and therefore, manufacturing cost becomes high. Further, according to a constitution of providing the light reflecting face to a separate board and pasting the board together with a board having a near field light generating element, the near field light head is thickened to constitute a hindrance against stability of floating up, a reduction in a float up amount, and an increase in a data access speed. Further, there is a drawback of thickening a cabinet in an information recording and reproducing apparatus mounted with the near field light head.

There has been requested a near field light head and an information recording and reproducing apparatus capable of efficiently guiding light to a near field light generating element and a record medium, capable of being fabricated easily and at low cost and in correspondence with small-sized formation and thin-sized formation.

SUMMARY OF THE INVENTION

A first mode of the invention for resolving the above-described problem resides in a near field light head characterized in a near field light head comprising a board, a light waveguide for introducing propagated light from a light source, and a near field light generating element for converting the propagated light into near field light, wherein the board includes the near field light generating element at a first face thereof, and includes the light waveguide on a second face thereof on a side opposed to the first face and the light waveguide comprises a first light waveguide connected to the light source, a second light waveguide a refractive index of which is changed continuously from a center thereof in a direction of a side face thereof, and a third light waveguide a refractive index of which is uniform, the first light waveguide, the second light waveguide and the third light waveguide are coaxially arranged in this order, and an end face of the third light waveguide opposed to an end face thereof opposed to the second light waveguide includes a reflecting face for guiding the propagated light to the near field light generating element.

A second mode of the invention resides in the near field light head characterized in that the light waveguide includes a fourth light waveguide coaxially arranged between the first light waveguide and the second light waveguide and having a uniform refractive index in the first mode.

A third mode of the invention resides in the near field light head characterized in that the fourth light waveguide is a coreless fiber in the second mode.

A fourth mode of the invention resides in the near field light head resides in that the first light waveguide is a single mode fiber in any one of the first through the third modes.

A fifth mode of the invention resides in the near field light head characterized in that the second light waveguide is a graded index fiber in any one of the first through the fourth modes.

A sixth mode of the invention resides in the near field light head characterized in that a length L of the graded index fiber is defined as L=(0.25+0.5n)×P (n is a nonnegative integer) with respect to a period P of a sinusoidal optical path of the graded index fiber in the fifth mode.

A seventh mode of the invention resides in the near field light head characterized in that a length L of the graded index fiber is defined as follows with respect to a period P of a sinusoidal optical path of the graded index fiber in the fifth mode.

$$(0.25+0.5n)\times P < L < (0.5+0.5n)\times P \text{ ($n$ is a nonnegative integer)}$$

An eighth mode of the invention resides in the near field light head characterized in that the third light waveguide is a coreless optical fiber in any one of the first through the seventh modes.

A ninth mode of the invention resides in the near field light head characterized in further comprising a lens for converging the propagated light reflected by the reflecting face to the near field light generating element at a surface of the board or at inside of the board in any one of the first through the eighth modes.

A tenth mode of the invention resides in the near field light head characterized in that a metal film is formed on the reflecting face in any one of the first through the ninth modes.

An eleventh mode of the invention resides in the near field light head characterized in that a portion of a side face of the third light waveguide opposed to the board constitutes a plane in parallel with the board in any one of the first through the tenth modes.

A twelfth mode of the invention resides in the near field light head characterized in that the board includes a groove on the first face and at least a portion of the first through the fourth light waveguides is fixed to the groove in any one of the first through the eleventh modes.

A thirteenth mode of the invention resides in the near field light head characterized in that a section of at least a portion of the first light waveguide is smaller than a section of the second light waveguide in any one of the first through the twelfth modes.

A fourteenth mode of the invention resides in an information recording and reproducing apparatus mounted with the near field light head in any one of the first through the thirteenth modes.

BRIEF DESCRIPTION OF THE DRAWINGS

For a more better understanding of the present invention, reference is made of a detailed description to be read in conjunction with the accompanying drawings, in which.

DETAILED DESCRIPTION OF THE PREFERRED EMBODIMENT

The best mode for carrying out the invention will be explained as follows in reference to the drawings.

Embodiment 1

Figure 1A:
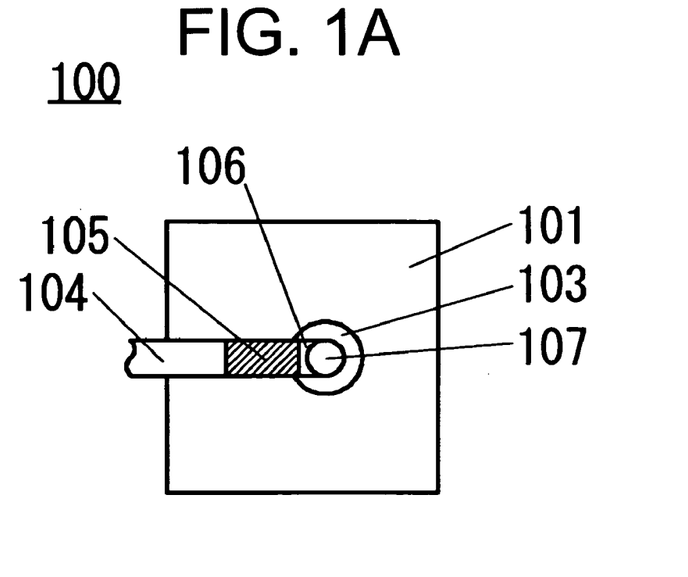
FIGS. 1A–1C illustrate three face views showing a constitution of a near field light head according to Embodiment 1 of the invention.
Figure 1B:
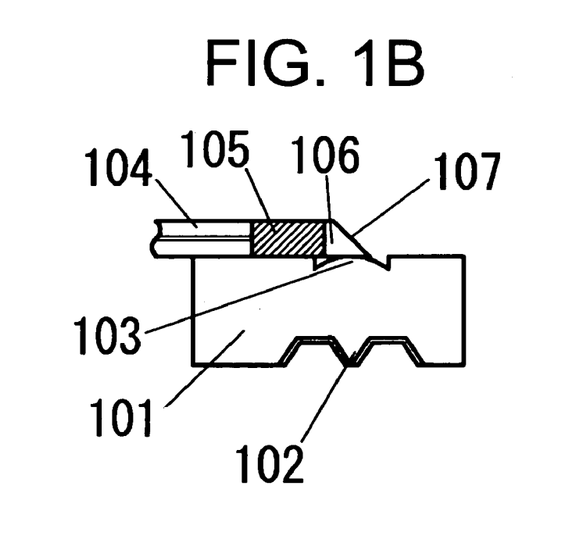
Figure 1C:
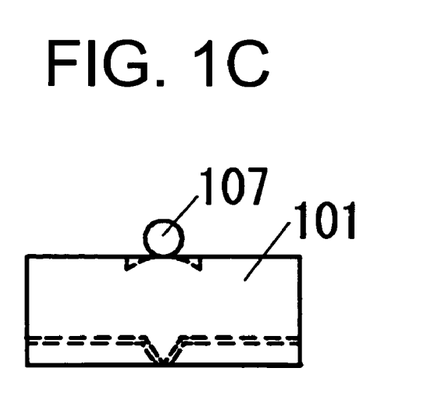

FIG. 1 illustrates three face views showing a constitution of a near field light head 100 according to Embodiment 1 of the invention. FIG. 1A is a top view, FIG. 1B is a sectional view from a front face, and FIG. 1C is a side view.

A transparent board 101 includes a near field light generating element 102 at a lower face thereof. That is, the near field light generating element 102 is provided at a face thereof opposed to a record medium (not illustrated). The near field light generating element 102 includes one or more of elements of an optically small opening, small projection, a metal thin film having a thickness of several nm to several hundreds nm, and a small scattering member. A lens 103 is formed at an upper face or inside of the transparent board 101 to be opposed to the near field light generating element 102. The upper face of the transparent board 101 is mounted with a single mode fiber 104. An end face of the single mode fiber 104 is connected with a graded index (GI) fiber 105. Further, an end face of the GI fiber 105 which is not connected with the single mode fiber 104 is connected with a coreless fiber 106. An end face of the coreless fiber 106 which is not connected with the GI fiber 105 constitutes a reflecting face 107 constituting substantially 45 degrees relative to the upper face of the transparent board 101. The reflecting face 107 is arranged right above the lens 103. As described above, the single mode fiber 104, the GI fiber 105 and the coreless fiber 106 are arranged coaxially.

Light emitted from a light source (not illustrated) is successively propagated inside of the single mode fiber 104, the GI fiber 105 and the coreless fiber 106, reflected by the reflecting face 107, converged by the lens 103 and guided to the near field light generating element 102. When light is introduced into the near field light generating element 102, near field light is generated from the near field light generating element 102.

Figure 2:
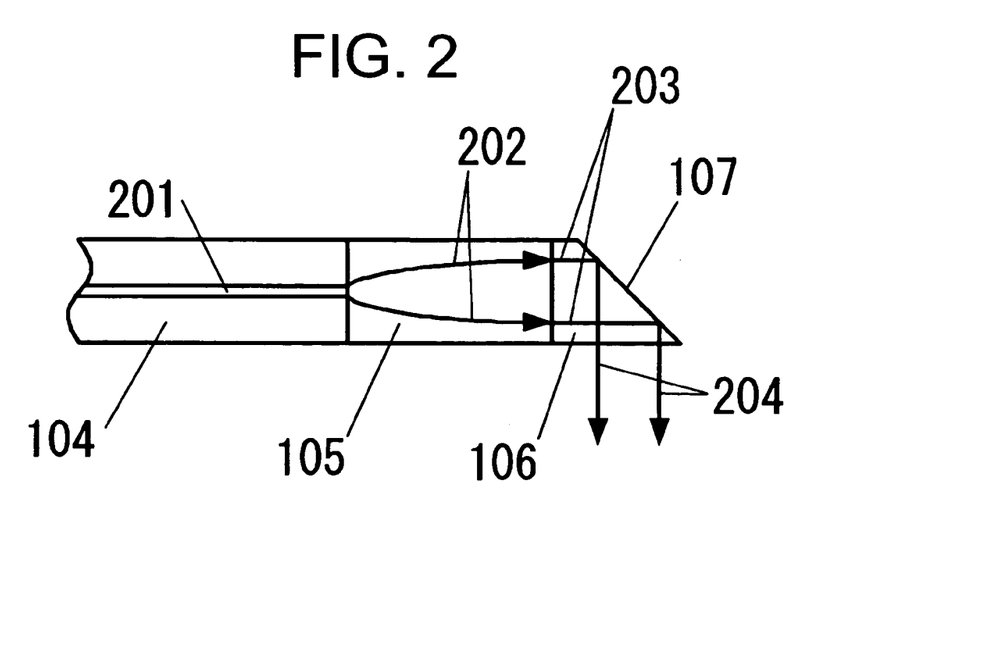
FIG. 2 is a detailed view of a fiber portion according to Embodiment 1 of the invention.

FIG. 2 is a detailed view of a fiber portion according to Embodiment 1 of the invention.

The single mode fiber 104 includes a core 201 at an axis center thereof.

The GI fiber 105 connected to the single mode fiber 104 is an optical fiber in which in a field of propagating light, a refractive index of a center thereof is larger than a refractive index of an outer periphery thereof, and the refractive index is changed from the center continuously in a circumferential direction. A refractive index n at a distance r from the fiber center is represented by the following equation.

$$n(r) = n0 \times (1 - (A/2) \times r \times r)$$

Notation n0 designates the refractive index of the fiber center. Further, notation $\sqrt{A}$ is generally referred to as a refractive index distribution coefficient. In the GI fiber, incident light is propagated on a sinusoidal optical path. A period of the sinusoidal optical path is referred to as a pitch of the GI fiber. The pitch P is calculated by the following equation.

$$P = 2\pi/\sqrt{A}$$

A length L of the GI fiber 105 is calculated by the following equation.

$$L = (0.25 + 0.5n) \times P \text{ (}n\text{ is a nonnegative integer)}$$

Thereby, light 202 emitted from the core 201 of the single mode fiber 104 becomes collimated light 203 by the GI fiber 105 and is emitted. For example, when light having a wavelength of 488 nm is used in the near field light head of the invention, by using the single mode fiber 104 having the diameter of the core 201 of about 3 μm, setting the refractive index distribution constant of the GI fiber 105 to 3 and constituting the length of the GI fiber 105 by 524 μm, that is, 0.25 times as match as the pitch, collimated light of about φ30 μm can be provided.

Collimated light 203 emitted from the GI fiber is propagated in the coreless fiber 106 while staying to be collimated, reflected by the reflecting face 107 and becomes emitted light 204 from a side face of the coreless fiber 106.

In connecting the single mode fiber 104 and the GI fiber 105 as well as the GI fiber 105 and the coreless fiber 106, fibers can be connected by aligning fiber outer diameters thereof easily and accurately by using a welding connector. The GI fiber 105 can be worked to an arbitrary length and smoothly in a cut face thereof by using a cleaver. Further, in order to ensure a reflection efficiency of the reflecting face 107, a surface roughness of the reflecting face 107 needs to be equal or smaller than about a wavelength of light used in the near field light head of the invention. Therefore, the reflecting face 107 may be formed by polishing. Further, in order to increase the reflection efficiency of the reflecting face 107, a surface of the reflecting face 107 may be formed with a metal film of aluminum, gold or the like.

Figure 9:
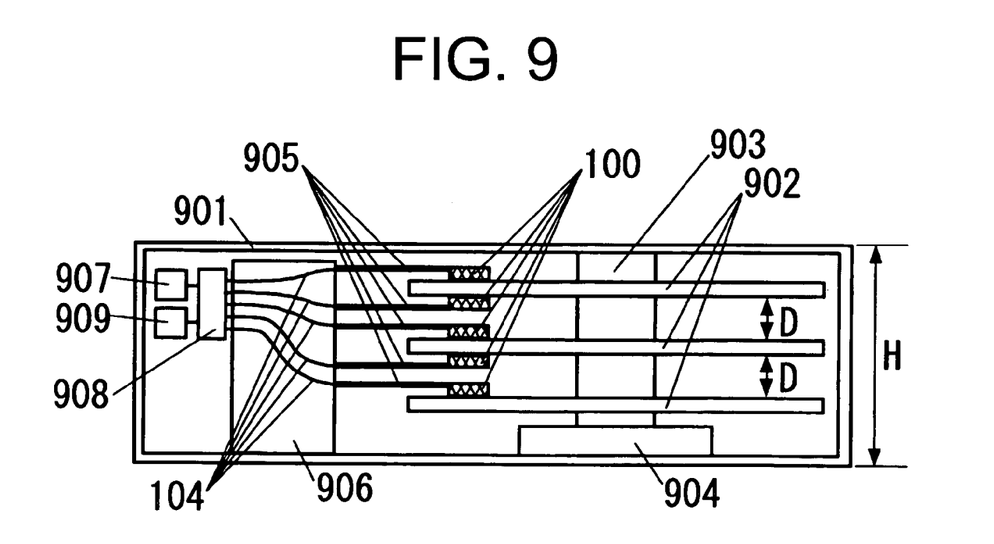
FIG. 9 is a view showing a constitution of an information recording and reproducing apparatus mounted with the near field light head according to Embodiment 1 of the invention.

FIG. 9 is a view showing a constitution of an information recording and reproducing apparatus using the near field light head 100 according to Embodiment 1 of the invention. Inside of a cabinet 901 of the information recording and reproducing apparatus is provided with a record medium 902 in a shape of a circular disk, the record medium 102 is fixed to a shaft 903 at a center thereof, and the shaft 903 is rotatably fixed to the cabinet 901 and a motor 904 fixed to the cabinet 901. The record medium 902 may be a writable medium, or a medium exclusive for reproduction, in the case of the former, data is held by using a phase change material or a magnetic material and in the case of the latter, data is held by recesses and projections or presence or absence of a metal film. The record medium 902 is rotated in accordance with rotation of the motor 904. Although a number of sheets of the record media 902 may be a single sheet or a plurality of sheets, in this case, an explanation will be given thereof as the plurality of sheets. The near field light head 100 is floated up on air above a surface of at least one of an upper face and a lower face of each of the plurality of record media 902 at an interval of several tens nm therebetween. The near field light head 100 is supported by an arm 905, the arm 905 is attached to a voice coil motor 906 and the arm 905 is operated in accordance with operation of the voice coil motor 906. The single mode fiber 104 which is a part of each near field light head 100 is attached to a splitter 908. The splitter 908 is optically coupled with a light source 907 and a light receiver 909. The motor 904 and the voice coil motor 906 constitute driving means for arranging the near field light head 100 to an arbitrary position of the record medium 902, and by rotation of the motor 904 and operation of the voice coil motor 906, the near field light head 100 can be made to access an arbitral position on the record medium 902.

Operation in recording information will be described as follows. An optical signal in correspondence with information is generated by the light source 907, reaches the near field light head 100 via the splitter 908 and the optical fiber 104, and generates near field light (not illustrated) from the near field light generating element 102. The near field light is interactively operated with an arbitrary information unit on the record medium 902 to thereby optically or thermally change the information unit and to record information.

Operation in reproducing information will be described as follows. Reference light generated by the light source 907 reaches the near field light head 100 via the splitter 908 and the optical fiber 104 and generates near field light (not illustrated) from the near field light generating element 102. The near field light is interactively operated with an arbitrary information unit holding information on the record medium 902 to thereby scatter the near field light and scattered light is detected by the light receiver 909 via the near field light generating element 102, the optical fiber 104 and the splitter 908. Thereby, information is optically reproduced from the information unit.

According to the embodiment, light introduced by the single mode fiber 104 can be guided to the lens 103 by being reflected by the reflecting face 107 formed at the end face of the coreless fiber 106. It is not necessary to prepare a separate board or the like having a reflecting face and the near field light head can be constituted by small-sized formation and thin-sized formation. Therefore, when the near field light head of the embodiment is mounted to the information recording and reproducing apparatus, intervals D among the plurality of record media 909 can be reduced and a height H of the cabinet 901 can be reduced and therefore, the information recording and reproducing apparatus can be constituted by small-sized formation and thin-sized formation, or high density formation.

Further, the collimated light 203 can be provided by the GI fiber 105 and therefore, a position accuracy in a fiber axis direction of the reflecting face 107 may be low. Although the reflecting face 107 may be formed by polishing, it is difficult to ensure the positional accuracy in the fiber axis direction by polishing and therefore, the constitution which does not need a high positional accuracy in the fiber axis direction is effective. Thereby, a sufficient light amount can easily be realized in supplying to the near field light generating element 102.

Further, the sufficiently collimated light 203 can be provided by an accuracy of a length of the GI fiber 105 of about ±10 μm and therefore, a step of cutting the GI fiber 105 is facilitated. Thereby, the sufficient light amount can easily be realized in supplying to the near field light generating element 102.

Further, the welding connector can be used for respectively connecting the single mode fiber 104, the GI fiber 105 and the coreless fiber 106 and therefore, connection with high accuracy positioning can easily be executed. Thereby, the sufficient light amount can easily be realized in supplying to the near field light generating element 102. Further, the near field light head can be produced at low cost and by a large amount.

Further, the reflecting face 107 can be worked by polishing and therefore, the low cost and high function reflecting face can easily be formed and sufficient light amount can be supplied to the near field light generating element 102.

Further, in place of the single mode fiber 104 according to the embodiment, a polarized wave face holding fiber, a multi mode fiber, a light waveguide or the like can be used.

Embodiment 2

Figure 3:
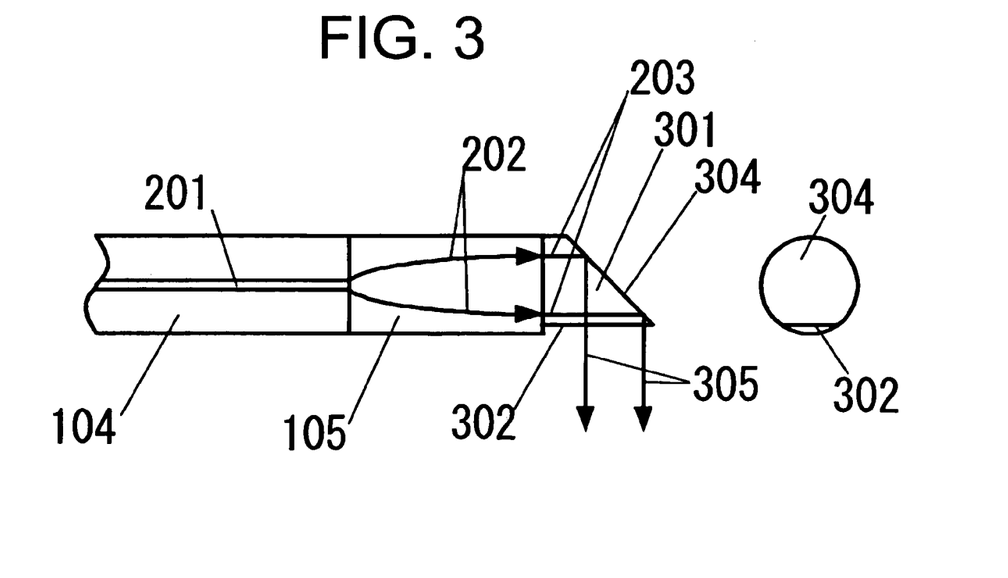
FIG. 3 is a detailed view of a fiber portion according to Embodiment 2 of the invention.

FIG. 3 is a detailed view of a fiber portion according to the Embodiment 2 of the invention.

A near field light head in this case is substantially the same as the near field light head according to Embodiment 1. However, the near field light head differs therefrom in that one side face of a coreless fiber 301 constitutes a plane 302. Collimated light 203 emitted from the GI fiber 105 is reflected by a reflecting face 304 and becomes emitted light 305 via a plane 302.

In order to ensure a transmission efficiency of the plane 302, a surface roughness of the plane 302 needs to be substantially equal to or smaller than a wavelength of light used in the near field light head according to the invention. Therefore, the plane 302 may be made by polishing.

According to the embodiment, in addition to an effect of Embodiment 1, the emitted light 305 is emitted by passing the plane 302 and therefore, the emitted light 305 becomes collimated light and light can efficiently be guided to the near field light generating element.

Embodiment 3

Figure 4A:
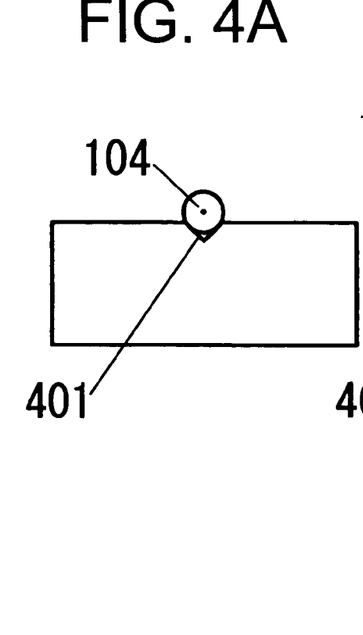
FIGS. 4A–4B illustrate views showing a constitution of a near field light head according to Embodiment 3 of the invention.
Figure 4B:
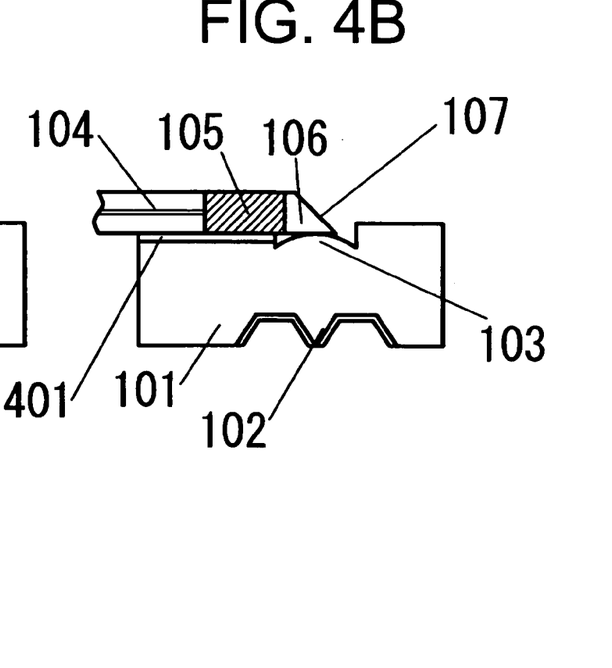

FIG. 4 illustrates views showing a constitution of a near field light head according to Embodiment 3 of the invention. FIG. 4A is a sectional view from a side face and FIG. 4B is a sectional view from a front face.

The near field light head in this case is substantially the same as the near field light head according to Embodiment 1. However, the near field light head differs therefrom in that a V-groove 401 is formed at the upper face of the transparent board 101, and at least one, a total or a portion of the single mode fiber 104, the GI fiber 105, and the coreless fiber 106 is (are) fixed to the V-groove 401.

According to the embodiment, in addition to the effect of Embodiment 1, positioning of the optical fiber is facilitated by the V-groove 401. Further, by summerizingly working the V-groove 401 and the lens 103, high accuracy optical axis aligning can easily be carried out. Thereby, the sufficient light amount can be facilitated in supplying to the near field light generating element 102. Further, the near field light head can be produced at low cost and by a large amount.

Embodiment 4

Figure 5:
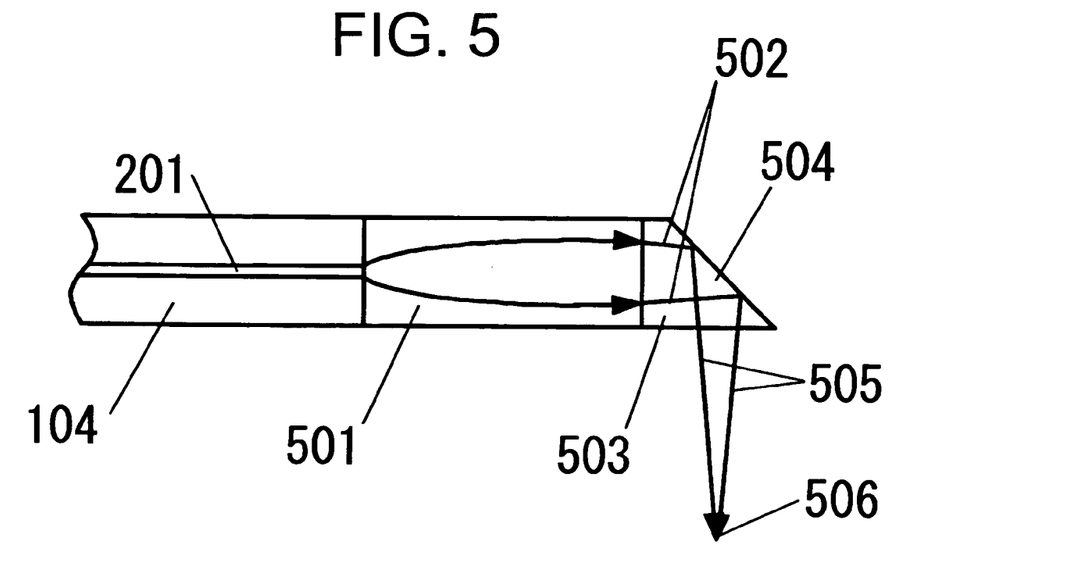
FIG. 5 is a detailed view of a fiber portion according to Embodiment 4 of the invention.

FIG. 5 is a detailed view of a fiber portion according to Embodiment 4 of the invention.

A near field light head in this case is substantially the same as the near field light head according to Embodiment 1. However, the length L of the GI fiber 501 is calculated by the following equation and the near field light head differs therefrom in that a lens is not provided (not illustrated).

$$(0.25+0.5n) \times P < L < (0.5+0.5n) \times P \text{ (}n\text{ is a nonnegative integer)}.$$

Emitted light 502 from a GI fiber 501 is propagated in a coreless fiber 503, reflected by a reflecting face 504 and becomes emitted light 505 from a side face of the coreless fiber 503. Emitted light 505 is gradually converged to provide a converging point 506. A near field light generating element (not illustrated) is arranged at the converging point 506.

According to the embodiment, the lens which is needed in Embodiment 1 is not needed and mass production can be carried out at lower cost.

Embodiment 5

Figure 6:
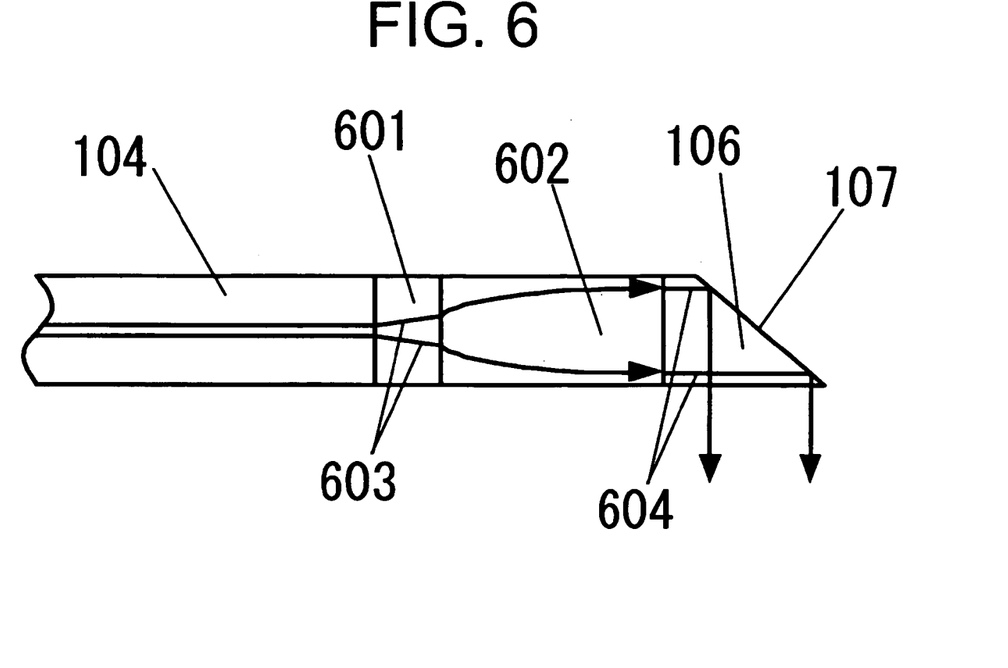
FIG. 6 is a detailed view of a fiber portion according to Embodiment 5 of the invention.

FIG. 6 is a detailed view of a fiber portion according to Embodiment 5 of the invention.

A near field light head in this case is substantially the same as the near field light head according to Embodiment 1. However, the near field light head differs therefrom in that a coreless fiber 601 is provided between the single mode fiber 104 and a GI fiber 602. Also the coreless fiber 601 is arranged coaxially with the single mode fiber 104, the GI fiber 602 and the coreless fiber 106 similarly to Embodiment 1. Also the coreless fiber 106 having the reflecting face 107 is provided similarly to Embodiment 1. A beam diameter of emitted light 603 from the single mode fiber 104 is widened in the coreless fiber 601 and is incident on the GI fiber 602. Although similarly to Embodiment 1, emitted light 604 from the GI fiber 602 is collimated light, in comparison with Embodiment 1, the beam diameter is increased. Emitted light 604 is propagated in the coreless fiber 106 and is reflected by the reflecting face 107.

According to the embodiment, in addition to the effect of Embodiment 1, emitted light having the large beam diameter can be provided and therefore, NA of light incident on the near field light generating element 102 via the lens 103 can be increased. Thereby, near field light can be generated more efficiently than the near field light generating element 102.

Embodiment 6

Figure 7:
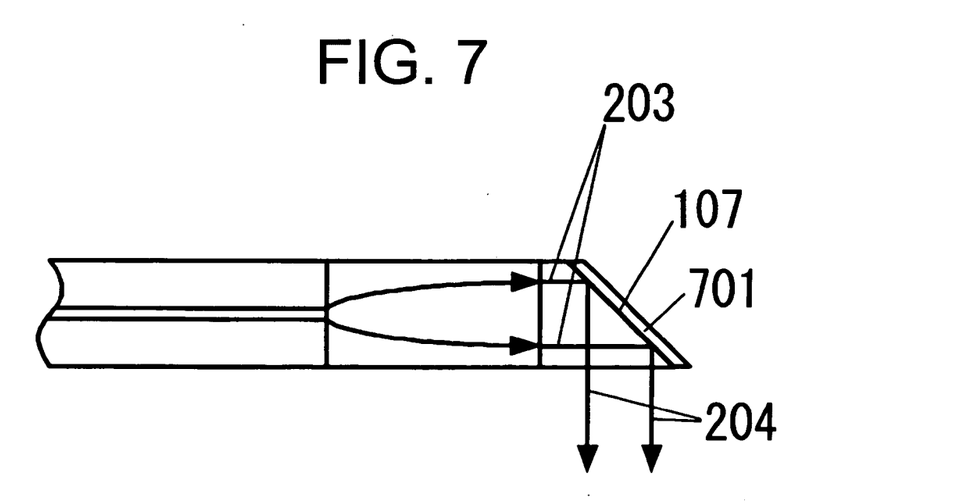
FIG. 7 is a detailed view of a fiber portion according to Embodiment 6 of the invention.

FIG. 7 is a detailed view of a fiber portion according to Embodiment 6 of the invention.

A near field light head in this case is substantially the same as the near field light head according to Embodiment 1. However, the near field light head differs therefrom in that a metal film 701 is formed on the reflecting face 107. Aluminum or gold may be used for the metal film 701 and the metal film 701 is formed by a sputtering apparatus or a vacuum deposition apparatus. Further, a film thickness thereof is several hundreds nm.

According to the embodiment, in addition to the effect of Embodiment 1, collimated light 203 can be converted into emitted light with higher efficiency. Thereby, near field light can efficiently be generated from the near field light generating element 102.

Embodiment 7

Figure 8:
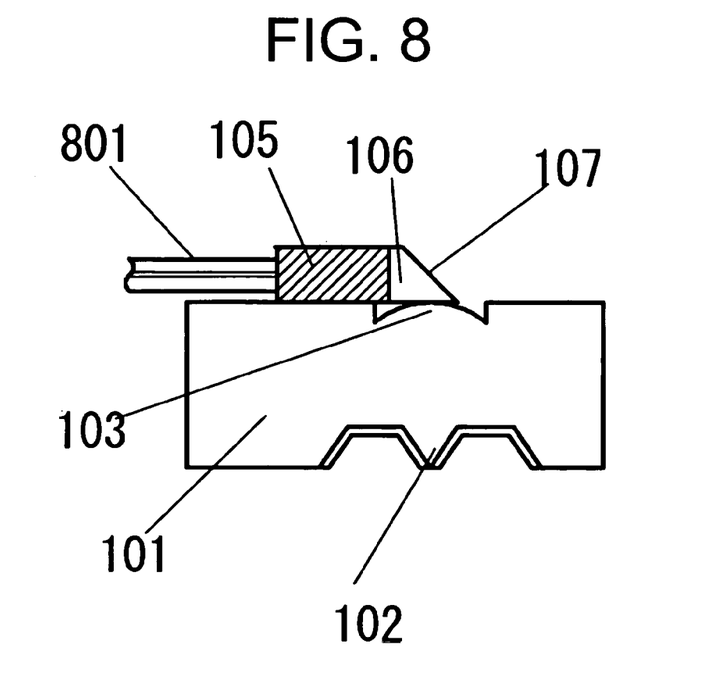
FIG. 8 is a view showing a constitution of a near field light head according to Embodiment 7 of the invention.

FIG. 8 is a view showing a constitution of a near field light head according to Embodiment 7 of the invention.

The near field light head in this case is substantially the same as the near field light head according to Embodiment 1. However, the near field light head differs therefrom in that a diameter of a single mode fiber 801 becomes smaller than a diameter of the GI fiber 105. The single mode fiber 801, the GI fiber 105, and the coreless fiber 106 are coaxially connected.

According to the embodiment, in addition to the effect of Embodiment 1, there is achieved an advantage of not hampering the near field light head from being floated up on air by reducing the diameter of the single mode fiber 801. At the same time, since the diameters of the GI fiber 105 and the coreless fiber 106 are similar to those of Embodiment 1, collimated light having a sufficient diameter can be provided.

As has been explained above, according to the invention, the propagated light introduced from the light waveguide can be guided to the near field light generating element by being reflected by the reflecting face formed at the end face of the light waveguide. It is not necessary to prepare a separate board or the like having a reflecting face and the near field light head can be constituted by small-sized formation and thin-sized formation. Therefore, an information recording and reproducing apparatus mounted with the near field light head can be constituted by small-sized formation and thin-sized formation or high density formation.

Further, by using the light waveguide the refractive index of which is changed continuously from the center in the direction of the side face, an angle of widening light emitted from the light waveguide can freely be selected.

Further, by using a GI fiber (second light waveguide) in the light waveguide and pertinently setting the length, collimated light can be provided and therefore, an accuracy of a position of the reflecting face in a direction of a fiber axis may be low. Although the reflecting face may be formed by polishing, it is difficult to ensure the accuracy of the position in the direction of the fiber axis by polishing and therefore, the constitution which does not need a high accuracy of the position in the direction of the fiber axis is effective.

Thereby, a sufficient light amount can easily be realized in supplying to the near field light generating element.

Further, by using a light waveguide having a uniform refractive index or a coreless fiber (forth light waveguide) at a portion of the light waveguide, a beam diameter of emitted light can be enlarged.

Further, by using the light waveguide having the uniform refractive index or coreless fiber (third light waveguide) at a portion of the light waveguide, an optical path can be extended while maintaining an angle of widening light by the GI fiber.

Further, by using the single mode fiber (first light waveguide) at a portion of the light waveguide, light from the light source can be guided to the optical head with high efficiency.

Further, a welding connector can be used for respectively connecting the single mode fiber, the GI fiber and the coreless fiber and therefore, connection accompanied by positioning with high accuracy can easily be executed. Thereby, the sufficient light amount can easily be realized in supplying to the near field light generating element. Further, the near field light head can be fabricated at low cost and by a large amount.

Further, by using the lens on the optical path, light can efficiently be guided to the near field light generating element.

Further, by constituting the plane in parallel with the board by a portion of the side face of the light waveguide opposed to the board, emitted light from the light waveguide is emitted by passing the plane and therefore, collimated light can be maintained and light can efficiently be guided to the near field light generating element.

Further, both of the reflecting face and the plane can be worked by polishing and therefore, a low cost and high function reflecting face or transmitting face can easily be formed and the sufficient light amount can be supplied to the near field light generating element.

Further, by forming the metal film on the reflecting face, the reflecting face with higher function can be provided.

Further, by the groove formed on the board, positioning of the light waveguide is facilitated. Further, by summerizingly working the groove and the lens, aligning of an optical axis with high accuracy can easily be executed. Thereby, the sufficient light amount can easily be supplied to the near field light generating element. Further, the near field light head can be fabricated at low cost and by a large amount.

Further, by making a diameter of the single mode fiber (first light waveguide) smaller than a diameter of the GI fiber (second light waveguide), the near field light head is not hampered from being floated up on air while ensuring a sufficient diameter of collimated light.

What is claimed is:

1. A near field light head comprising:
   a board;
   a light waveguide for introducing propagated light from a light source; and
   a near field light generating element for converting the propagated light into near field light,
   wherein the board has the near field light generating element at a first face thereof, and has the light waveguide on a second face thereof on a side opposed to the first face, and the light waveguide comprises a first light waveguide connected to the light source, a second light waveguide a refractive index of which is changed continuously from a center thereof in a direction of a side face thereof and a third light waveguide a refractive index of which is uniform, the first light waveguide, the second light waveguide and the third light waveguide are coaxially arranged in this order, and an end face of the third light waveguide opposed to an end face thereof opposed to the second light waveguide includes a reflecting face for guiding the propagated light to the near field light generating element.

2. The near field light head according to claim 1, wherein the light waveguide has a fourth light waveguide coaxially arranged between the first light waveguide and the second light waveguide, the fourth light waveguide having a uniform refractive index.

3. The near field light head according to claim 2, wherein the fourth light waveguide is a coreless fiber.

4. The near field light head according to claim 1, wherein the first light waveguide is a single mode fiber.

5. The near field light head according to claim 1, wherein the second light waveguide is a graded index fiber.

6. The near field light head according to claim 5, wherein a length L of the graded index fiber is defined as L=(0.25+0.5n)×P (n is a nonnegative integer) with respect to a period P of a sinusoidal optical path of the graded index fiber.

7. The near field light head according to claim 5, wherein a length L of the graded index fiber is defined as follows with respect to a period P of a sinusoidal optical path of the graded index fiber:

$$(0.25+0.5n) \times P < L < (0.5+0.5n) \times P \text{ (}n\text{ is a nonnegative integer)}.$$

8. The near field light head according to claim 1, wherein the third light waveguide is a coreless optical fiber.

9. The near field light head according to claim 1, further comprising:
   a lens for converging the propagated light reflected by the reflecting face to the near field light generating element at a surface of the board or at inside of the board.

10. The near field light head according to claim 1, wherein a metal film is formed on the reflecting face.

11. The near field light head according to claim 1, wherein a portion of a side face of the third light waveguide opposed to the board constitutes a plane in parallel with the board.

12. The near field light head according to claim 1, wherein the board includes a groove on the first face and at least a portion of the first through the fourth light waveguides is fixed to the groove.

13. The near field light head according to claim 1, wherein a sectional area of the first light waveguide in a direction orthogonal to a direction of advancing the propagated light is smaller than a sectional area of the second light waveguide in the direction orthogonal to the direction of advancing the propagated light.

14. An information recording and reproducing apparatus comprising the near field light head according to claim 1, a record medium having a recording layer for recording information on a face thereof opposed to the near field light head, and driving means for arranging the near field light head at an arbitrary position of the record medium.

* * * * *